Patented Nov. 3, 1942

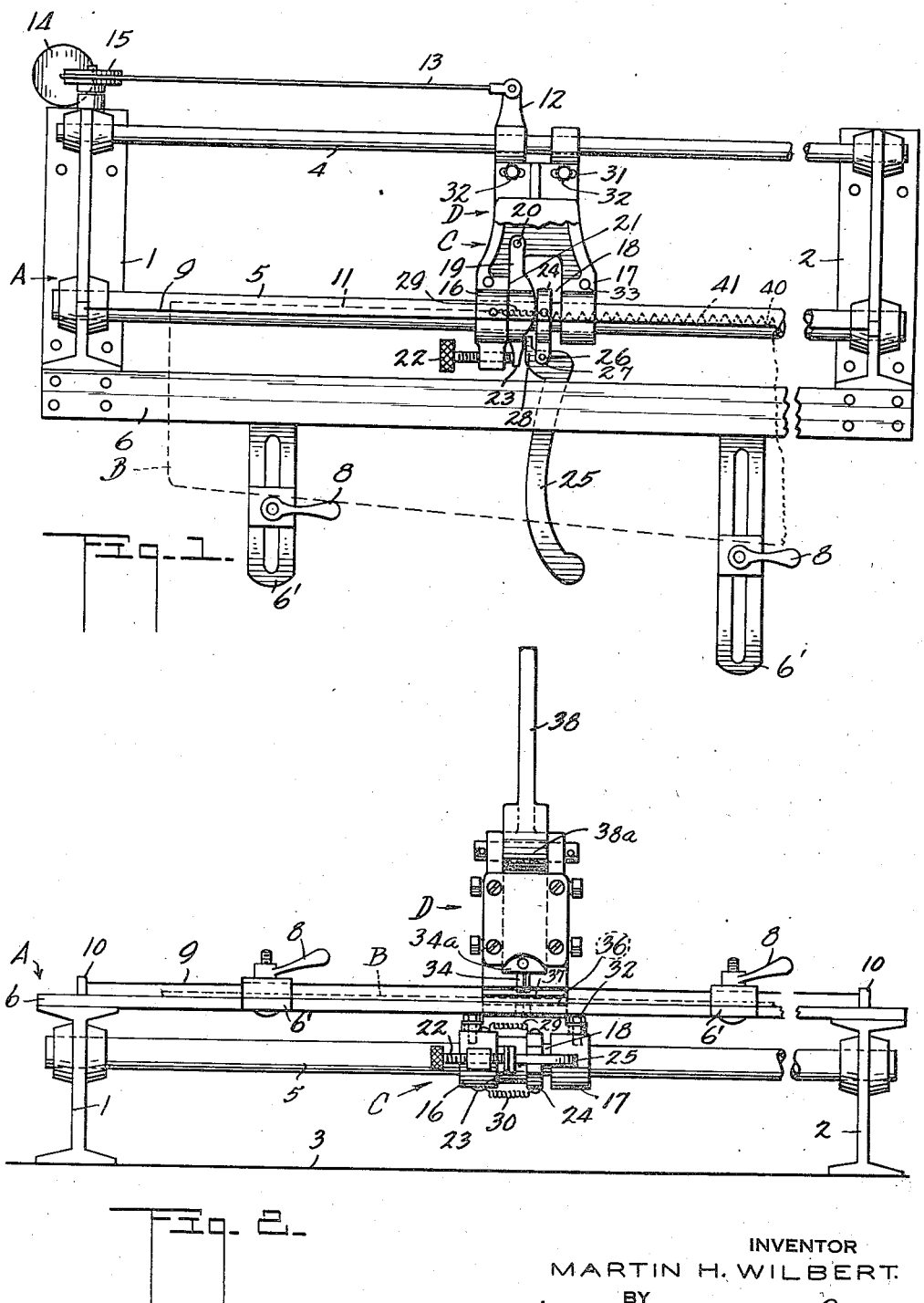

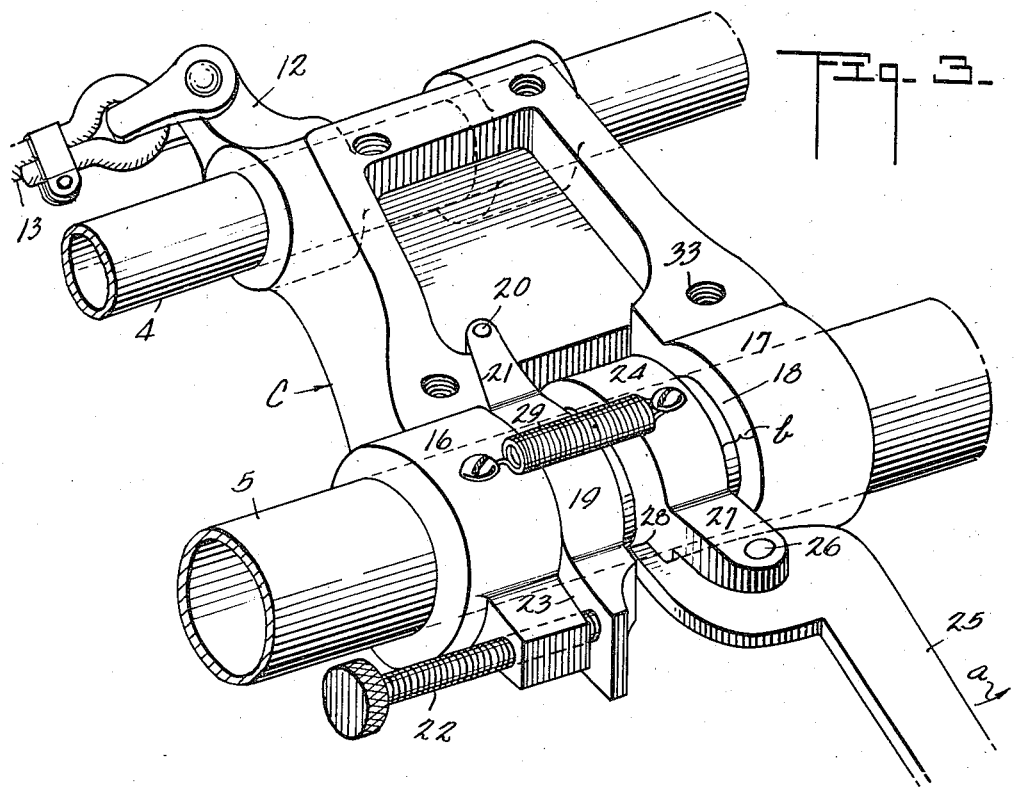

2,300,717

UNITED STATES PATENT OFFICE 2,300,717

SAW RETOOTHING MACHINE

Martin H. Wilbert, San Bruno, Calif.

Application October 21, 1940, Serial No. 362,039

4 Claims. (Cl. 76—29)

When a saw has been used for a certain length of time, the teeth become so worn that it is necessary to cut new teeth in the saw blade. In the usual retoother used for this purpose, the saw is clamped in a frame and the saw and frame are moved with respect to a punch. Different graduated carriers are used for punching the desired number of tooth points per inch in the saw. It is necessary that a set of carriers be kept on hand so that all types of teeth may be cut.

An object of my invention is to provide a saw retoother in which the carriers are not used, but instead novel means are provided for stepwise advancing a tooth-cutting die along the edge of a saw at an adjustable predetermined distance after each operation of the die.

The number of saw tooth points to the linear inch cut by the die can be quickly changed by altering the distance moved by the die. The die can also be adjusted angularly for cutting the desired rake angle on each tooth. A novel visible gage line is used for determining the depth of the gullets between adjacent teeth and for causing all of the gullets to be of equal depth.

A further object of my invention is to provide a device of the type described, which is simple in construction, durable and efficient for the purpose intended.

Other objects and advantages will appear as the specification proceeds, and the novel features of the invention will be particularly set forth in the appended claims.

My invention is illustrated in the accompanying drawings, forming part of this application, in which:

Figure 1 is a top plan view of the saw retoothing machine, a portion of the punch being removed to disclose the mechanism therebelow;

Figure 2 a front elevation of Figure 1;

Figure 3 an enlarged perspective view of the punch-carrying head that I employ;

Figure 4 diagrammatically illustrates the die cutting saw teeth of the cross-cut type;

Figure 5 is a view similar to Figure 4 and indicates a different angular position of the die, such as used in a rip saw; and Figure 6 an isometric view of a portion of the punch disclosing the triangular die, the die block cooperating therewith and the visible gage wire.

While I have shown only the preferred form of my invention, it should be understood that various changes or modifications may be made within the scope of the appended claims without departing from the spirit of the invention.

In carrying out my invention, I provide a frame indicated generally at A. The frame has end castings 1 and 2 resting on a support 3, see Figure 2. Cylindrical guide bars or rods 4 and 5 extend between and are supported by the end castings 1 and 2. A saw clamping bar 6 is also carried by the end castings and this bar has a flat surface against which a saw blade B may rest. Slotted arms 6' extend at right angles from the bar 6 and clamps 8 slide along the slots and rigidly secure the saw blade B to the frame. A visible guide wire 9 is attached to uprights 10 that are mounted on the castings 1 and 2. The edge 11 of the saw blade B is arranged parallel to the wire 9 for a purpose hereinafter described. Although I have referred to the members 1 and 2 as being castings, it should be made clear that they may be formed from structural members or the like.

A sliding head C is movably mounted on the guide bars or rods 4 and 5, see Figure 3. The sliding fit of the head on the bars is such that an equal moving force must be applied to the front and back of the head and in a direction parallel to the bars before the head can be moved along the bars. If a moving force is applied to only one corner of the head, the head will have a tendency to twist and to bind on the rods, thus temporarily locking the head to the rods. I utilize this principle for securing the head to the bars at different desired points.

In Figures 1 and 3, I illustrate the head C as carrying a lug 12 at the left rear corner. A cable 13 has one end secured to the lug and has its other end supporting a counter weight 14. The cable is trained over a pulley 15 that in turn is rotatably mounted on the end casting 1. The weight will exert a continuous force on the lug 12, which will tend to twist the head and cause it to bind on the bars 4 and 5 and be held against movement.

I provide novel means for periodically applying an equal moving force on the front of the head C and this force will offset the binding tendency of the head and cause it to move along the bars. I further provide novel means adjustable in character for limiting the movement of the head to short predetermined distances, which may be altered at will. The front of the head C has two integral collars 16 and 17 that receive the bar 5 and are spaced from each other to provide a recess 18 therebetween. A pawl 19 is fulcrumed to the head C at 20 and has an opening large enough to loosely receive the bar 5. The pawl, when swung into its extreme left position, will abut a shoulder 21 on the head C. An adjusting screw 22 is threaded into a lug 23 carried by the collar 16 and bears against the pawl 19 and may be adjusted for swinging the pawl to the right for altering the length of the stepwise movement imparted to the head by the following mechanism.

A sliding collar 24 is mounted on the bar 5 and between the collars 16 and 17. A hand lever 25 is fulcrumed at 26 to a slotted boss 27 that projects forwardly from and is integral with the collar 24. The inner end 28 of the lever bears against the pawl 19 because two coil springs 29 and 30 connected to the tops and bottoms of the collars 16 and 24 urge the collar to the left until the end 28 contacts with the pawl.

It will be noted that the top and bottom springs 29 and 30 exert an even pull at diametrically opposite points on the collar 24 and this will move the collar along the bar without causing it to bind. When the lever 25 is swung in the direction of the arrow $a$, see Figure 3, the end 28 in bearing against the pawl 19 will tend to move the fulcrum 26 to the right and this will cause the collar 24 to bind on the bar 5.

It is best to describe the step by step movement of the head C before proceeding with the description of the punch D that is carried by the head. I have already explained how the head C is held against movement on the bars 4 and 5 by the twisting action imparted to it by the continuous pull of the weight 15 upon the corner lug 12. The springs 29 and 30 will exert an even pull on the collar 24 and cause it to yieldingly hold the end 28 of the lever against the pawl 19. The pawl in turn bears against the screw 22. When the parts are in this position, a space $b$ (see Figure 3) is provided between the right hand side of the collar 24 and the left hand side of the collar 17. The width of this space can be varied by turning the adjustment screw 22 to the desired extent. The head C will move the width of this space and no more each time the lever 25 is swung to the right in the direction of the arrow $a$.

When the operator wishes to advance the head C the width of the space $b$, he swings the lever to the right and this will cause the lever end 28 to exert a force against the pawl 19 and against the pivot point 26. The force exerted on the pivot point 26 will tend to move the boss 27 to the right and create a twisting force on the collar 24 sufficient to cause it to bind on the bar 5 and be held against movement to the right on the bar. Continued swinging of the lever 25 in an anticlockwise direction will increase the force exerted by the lever end 28 against the pawl 19 until it equals the pulling force of the cable 13 on the lug 12.

As soon as this is reached, the head C will have two forces of equal strength applied simultaneously to the front and back of the head with the result that the head will cease to bind on the bars 4 and 5, but instead will freely move to the left along the bars until the collar 17 strikes the collar 24. The head C is then stopped from further movement after moving through the distance of the space $b$. This space can be altered in width by the adjustment screw 22 in the manner already indicated.

The operator now frees the lever 25 and immediately the twisting action on the collar 24 is relieved and at the same time the weight 15 exerts a twisting action on the head C. The head will be temporarily locked in the position into which it has been moved. The freed collar 24 will now be acted upon by the springs 29 and 30 and moved until it again contacts with the pawl 19. This again creates the space $b$ and the head C is ready for the next stepwise advancement along the bars 4 and 5. In this manner, the head can be moved by step from the right hand side of the frame to the left and the length of the steps can be regulated by the screw 22.

The punch D is of standard construction and is mounted on the head C. The base of the punch has enlarged openings 31 for loosely receiving the shanks of cap screws 32. The latter are received in threaded openings 33 in the head C. The construction is such that the punch D can swing into angular positions with respect to the head C and then be secured in place. The punch has a die 34 triangular in cross section and movable into an opening 35 formed in a die block 36, see Figure 6. The die block 36 has a horizontal slot 37 for receiving the saw blade B. A changing of the angular position of the punch on the head C will cause the die 34 to cut teeth in the saw blade with the proper rake angle. A handle 38 has a cam 38$a$ that bears against the top of a slide 34$a$ (see Figure 2), the latter carrying the die 34. The die 34 has a leading portion 39 for guiding the die into the opening 35.

From the foregoing description of the various parts of the device, the operation thereof may be readily understood. The saw blade B is clamped to the frame so that a portion of the blade is received in the slot 37 of the die block. Care is taken that the edge 11 of the blade parallels the guide wire 9. The wire 9 extends over the die block and touches the front apex of the die 34. The distance between the blade edge 11 and the wire 9 determines the depth of the teeth gullets 40, see Figures 4 and 5. The angle of the die 34 determines the rake angle of the teeth and the adjustment screw 22 for varying the space $b$ determines the number of points to the inch.

In Figure 1, the teeth 41 cut into the edge 11 have front and rear edges extending at the same angle. In Figure 4 the punch has been rotated counterclockwise through a slight angle and the front edge of each tooth is more perpendicular to the saw edge 11 than the rear edge. In Figure 5, the angular turn of the die 34 is still greater with a corresponding change in the saw teeth.

After the desired angular turn of the die 34 is decided upon, and the space between adjacent teeth properly regulated, the handle 38 is actuated and the die 34 will cut a gullet 40 in the saw blade. The lever 25 is now actuated to move the punch the distance of one tooth and then the handle is again actuated, punching another gullet from the blade and forming a tooth 41. In like manner, the lever 25 and handle 38 are alternately actuated to cut teeth along the entire saw blade. Upon completion of the cutting of the teeth, the saw is removed and the teeth set in the usual manner. A cross cut saw will have its teeth bevelled after they have been set. The saw is now ready for use. It is obvious that the two alternate operations of the lever 25 and the handle 38 may be automatically accomplished, if desired.

I claim:

1. In a saw retoothing machine, a pair of parallel guide bars spaced from each other, a die-carrying header slidable along the bars, means for exerting a continual yielding force on the header adjacent to and parallel with one of the bars for tending to cause the header to twist on the bars and thus be clamped to the bars and held against movement relative thereto, and means for exerting a like force in the same direction on the header and adjacent to the other bar for freeing the twisting action and causing the header to advance along the bars, and adjustable means for limiting the movement of the header.

2. In a saw retoothing machine, a pair of parallel guide bars spaced from each other, a die-carrying header slidable along the bars, means for exerting a continual force at one end of the header for advancing it along the bars, this force tending to cause the header to twist on the bars and thus be temporarily clamped in place, and adjustable step by step means for exerting a series of like forces at the other end of the header for step-wise advancing it along the bars, said last-named means including a collar mounted on one of the bars, a lever fulcrumed at one side of the collar, a pawl pivoted to the header and having its free end bearing against one end of the lever, an adjustable screw for limiting movement of the pawl in one direction, and spring means exerting an even pull on both sides of the collar for yieldingly holding the lever in contact with the pawl.

3. A saw retoothing machine comprising means for holding a saw; a pair of guide rods; a tooth-punching die mounted on a header that is movable along the rods; means for exerting a continuous yielding force on the header and adjacent to one of the rods for moving the header in one direction along the rods; said means when acting alone exerting a pull on one side of the header for causing it to twist and bind on the rods, thus temporarily preventing farther movement; manually controlled means for exerting an equal pulling force on the header in the same direction as the first means and on the opposite side thereof and adjacent to the other rod; whereby the binding action of the header on the rods is relieved and the header will be advanced along the rods in the direction of the two pulling forces, and adjustable means for limiting the extent of movement of the header along the rods each time the manually controlled means is actuated.

4. In a saw retoothing machine, a pair of parallel guide bars spaced from each other, a die-carrying header slidable along the bars, means for exerting a continual force at one end of the header for advancing it along the bars, this force tending to cause the header to twist on the bars and thus be temporarily clamped in place, and adjustable step by step means for exerting a series of like forces at the other end of the header for step-wise advancing it along the bars, said last-named means including a collar slidably mounted on one of the bars, a lever fulcrumed at one side of the collar, adjustable means disposed on one side of the collar and contacting with one end of the lever, spring means exerting an even pull on the collar for yieldingly holding the lever in contact with the adjustable means, said header having a portion normally spaced from the side of the collar disposed opposite to the adjustable means, whereby said lever when actuated will exert a force to move the adjustable means away from the collar and to temporarily bind the collar to its bar, the collar thus acting as a stop when the header portion strikes it and limiting the header movement to a predetermined distance each time the lever is actuated.

MARTIN H. WILBERT.